(12) United States Patent
Meschter

(10) Patent No.: US 7,439,457 B1
(45) Date of Patent: Oct. 21, 2008

(54) APPARATUS FOR DETERMINING RELATIVE DENSITY OF PRODUCE USING WEIGHING AND SIZE MEASURING

(76) Inventor: John E Meschter, 435 E. 65th St. Apt. #10D, New York City, NY (US) 10021

( * ) Notice: Subject to any disclaimer, the term of this patent is extended or adjusted under 35 U.S.C. 154(b) by 46 days.

(21) Appl. No.: 11/803,040

(22) Filed: May 11, 2007

(51) Int. Cl.
  *G01G 3/08* (2006.01)
  *G01G 21/22* (2006.01)
  *G01G 23/14* (2006.01)
  *G01N 9/02* (2006.01)

(52) U.S. Cl. .................. 177/251; 177/246; 177/260; 177/262; 73/433; 73/865; 73/865.8

(58) Field of Classification Search .................. 177/151, 177/152, 246, 247, 251, 260, 261, 262; 73/73, 73/433, 32 R, 865, 865.8
See application file for complete search history.

(56) References Cited

U.S. PATENT DOCUMENTS

| 327,152 | A | * | 9/1885 | Fitch ........................... 177/127 |
| 634,162 | A | * | 10/1899 | Bracktle ..................... 177/127 |
| 645,091 | A | * | 3/1900 | Harmon ...................... 177/127 |
| 3,968,849 | A | * | 7/1976 | Dale et al. ................... 177/127 |
| 3,980,147 | A | * | 9/1976 | van der Schoot ............. 177/48 |
| 4,548,286 | A | | 10/1985 | Sashiki |
| 4,658,922 | A | * | 4/1987 | Kissick ....................... 177/127 |
| 4,721,173 | A | | 1/1988 | Hirota |
| 4,744,428 | A | * | 5/1988 | Knotter et al. .............. 177/127 |
| 6,268,573 | B1 | * | 7/2001 | Hartselle, III ............... 177/148 |
| 6,509,534 | B1 | * | 1/2003 | Thadani ...................... 177/126 |
| 6,600,110 | B1 | * | 7/2003 | Thadani et al. ............. 177/126 |

* cited by examiner

*Primary Examiner*—David A. Rogers
(74) *Attorney, Agent, or Firm*—Robert Nathans

(57) ABSTRACT

The higher the reading of relative density, liquid weight per unit volume, of pieces of produce such as fruits, the juicier the piece of produce is. By comparing a number of pieces of produce of the same type and species and ranking them, the juiciest pieces of produce may be easily selected and purchased by a shopper. An arrangement of linkages and a sliding spring element creates a device with two inputs, one input being proportional to the volume of the produce based on a representative diameter, and the other input being an approximation of the weight of the produce based on the deflection of a spring. The two inputs are mechanically combined to create one output indicative of density, and thus juiciness, and a pointer is employed whose deflection is proportional to the quotient of the weight and volumetric inputs of each piece of produce tested by the shopper.

20 Claims, 5 Drawing Sheets

APPARATUS FOR DETERMINING RELATIVE DENSITY OF PRODUCE USING WEIGHING AND SIZE MEASURING

BACKGROUND OF THE INVENTION

The present invention relates to the measurement of the relative densities of produce.

Commercial sorting of fruits and vegetables (hereafter referred to as "produce") often utilizes density measurement (the weight of the produce divided by the volume of the produce) as a way of discriminating between produce that is ripe and produce that is not ripe. This is because ripe produce has higher density than unripe produce.

For example, grapes are floated in tubs of saltwater with a predetermined specific gravity. Those grapes with high enough density to be considered ripe and sweet will just sink in the saltwater, while those grapes of insufficient density to be considered ripe and sweet will float in the saltwater. The grapes that float pass over and the grapes that sink are collected.

Similarly, pieces of produce such as oranges or peaches are each weighed, and the volume of each piece is measured; the quotient density is used to separate or grade the produce not only by size but also by ripeness. Thus the produce is sold in segregated groups by size and density.

However, after the produce has been so sorted, or if it has not been sorted at all, it often sits in warehouses, or on the store shelves, where it is subjected to variations in temperature and humidity such that the ripeness and desirability of the produce may change over time. The ultimate consumer of the produce wants to be able to ascertain whether or not the produce has desirable density and therefore ripeness or juiciness. In other words, the consumer wants to be able to tell if the orange or other produce being purchased is juicy and sweet or dried out and/or mealy in texture.

It is possible in the prior art to measure the density of produce by weighing the individual piece and measuring the individual volume, then dividing the weight by the volume to obtain the density. Comparing this value to an average, or expected value of density for that particular produce at conditions of ripeness or juiciness provides a discriminator of ripeness or juiciness for the individual piece in question.

Unfortunately, while it is fairly simple to measure the weight of a piece of produce, it is difficult to measure the volume because the shape of the produce is usually irregular and non-spherical. This makes it difficult to approximate volume by assuming that produce geometry matches known and easily calculated volumes of familiar geometric shapes, specifically spheres.

Because of the irregular geometry, the most commonly used method for measuring volume is to measure the volume of a liquid displaced by the volume of the produce. The volume of liquid displaced is measured in volumetrically graded containers and the volume of the produce is imputed from the volume of liquid displaced. Thus in order to measure density, the produce must be placed in a liquid bath.

Another method of measuring produce volume is by making numerous and precise measurements of the dimensions of the produce and computing, by many possible algorithms known in the art, the actual volume.

Yet another method is to place the produce in a chamber of known shape and volume (such chambers are often referred to as Helmholtz resonators) and to measure the difference in the resonance of the volume of air in the cavity with and without the produce. The resonance is a function of volume, and known algorithms are used to compute the volume of the produce.

Each of the foregoing methods, has a level of cost and difficulty which makes it undesirable as a quick means of ascertaining liquid content per unit volume of the produce, also called, and hereinafter referred to as relative density or "juiciness". A consumer standing in a supermarket or other venue, confronted with a bin full of produce, might like to have a simple, non-destructive, fast and sufficient means at his or her disposal for determining if the piece of produce in hand, that looks, feels, smells and otherwise seems acceptable, is also juicy. The present invention is intended to address the difficulties and shortcomings of prior methods and to provide a low-cost, simple, non-damaging, fast and sufficient means of ascertaining the relative liquid content of pieces of produce.

Produce of a single species is substantially similar in shape regardless of size. This enables comparative ranking of produce density because the errors of measurement of weight and particularly volume are constant multiples of the actual volume and weight. Any ranking of densities containing such errors in constituent weight or volume will still yield a correct ranking of density, even though the absolute measurement of density in engineering units will be incorrect. This constitutes an important advantage of the present invention.

BRIEF DESCRIPTION OF A PREFERRED EMBODIMENT OF THE INVENTION

The produce density measuring device combines a measure derived from the weight of the produce with a measure indicative of the volume of the produce to give a visual indication related to the relative density of the produce. The visual readout indication, is not necessarily calibrated in so-called engineering units and the measures derived from weight or volume are not necessarily measures of the actual volume or weight of the produce in engineering units.

In use, produce is placed on a cup upon a pivotable beam and a lid, is pivoted around its hinge until it rests against the surface of the produce. A pointer indicates by its position relative to an index or scale, the relative density and thus juice content of the produce. The higher the reading of relative density, the juicier the piece of produce is. By comparing a number of pieces of produce of the same type and species and ranking them, the juiciest pieces of produce may be beneficially purchased by a shopper in a produce store.

A simple arrangement of linkages and sliding spring elements create a device with two inputs, one input being an approximation of the volume of the produce based on a representative diameter and the consequent angle of a contacting lid, and the other input being an approximation of the weight of the produce based on the deflection of a spring. The two inputs are mechanically combined to create one output in the form of a pointer whose deflection is proportional to the quotient of the weight and volumetric inputs.

DETAILED DESCRIPTION OF PREFERRED EMBODIMENTS OF THE INVENTION

Figure 1:
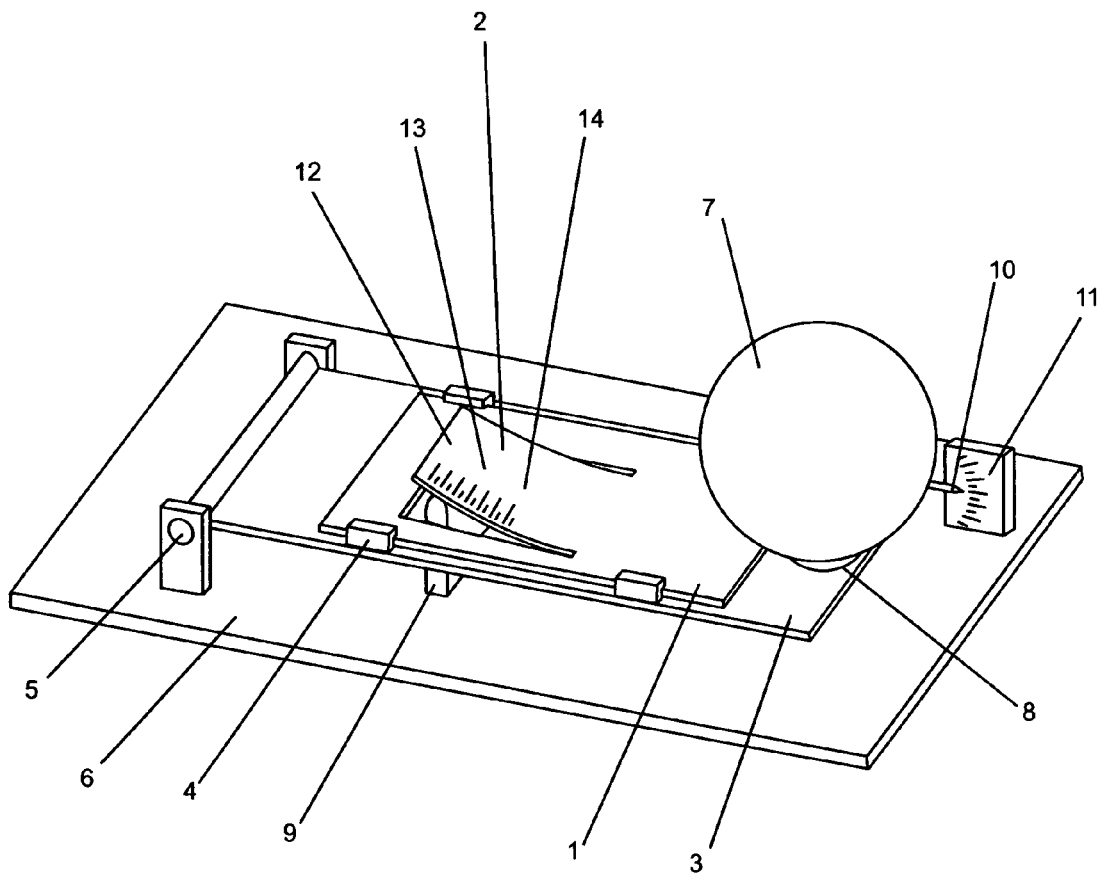
FIG. 1 is an oblique view of a cantilever spring and weight.

In FIG. 1, a spring 1, having a cantilever portion, 2, is held to a beam, 3 by fixing means, hereinafter referred to as cleats, 4. The beam, 3 is pivoted about pivot point 5 on ground plate or base member 6. A first spherical known mass of known volume, hereinafter referred to as a first weight, 7 is placed on the beam 3 at a known location 8. The cantilever portion 2 of the spring, 3, hereinafter referred to as the leaf, rests against the post 9, and is deflected by the first weight such that the tip of the beam 10 points to a fixed point on the scale 11. It will be clear to those practiced in the art that the greater is the mass of the first weight 7, the closer will be the deflection of the tip 10 of the beam 3 toward the ground plate 6. It will further be clear to practitioners of the art that the deflection of the beam tip 10 is proportional to the deflection of the leaf, 2.

Figure 2:
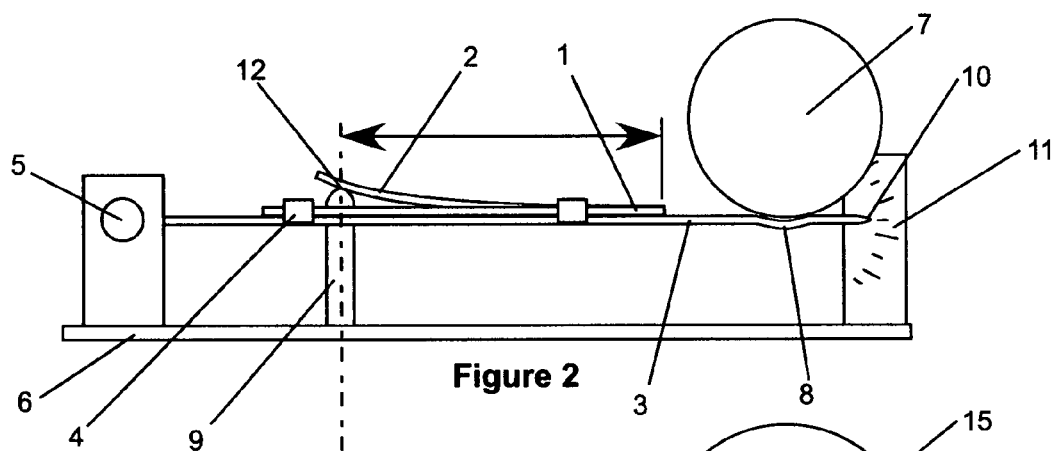
FIG. 2 is an elevation of the cantilever spring and weight, with the spring in a first position.
Figure 3:
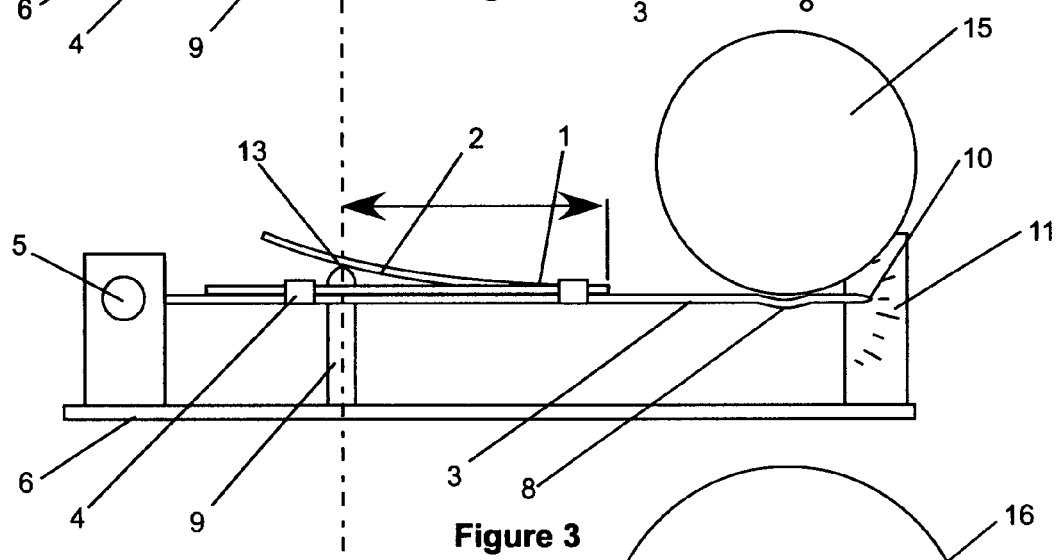
FIG. 3 is an elevation of the cantilever spring and weight, with the spring in a second position.

As shown in FIGS. 1 and 2, the first weight 7 and the position 12 of the spring 1 on the beam 3 relative to the pivot 5 are chosen such that the tip of the beam 10 points to a given position on the scale 11, as shown in FIG. 2. Next, as shown in FIG. 3, the first weight 7 is replaced by a second spherical known mass of known volume and hereinafter referred to as the second weight 15, having a different volume and a larger mass than the first weight 7. If the tip of the beam 10 is to remain pointing to the same given position on the scale 11, the spring 1 will have to be moved to a second position 13 such that the cantilever length of the leaf 2 to the point of contact with the fulcrum post 9 is shorter than it was with the first weight 7 as in FIG. 2, and the effective spring constant of the leaf is greater than it was with the first weight 7 as in FIG. 2.

Figure 4:
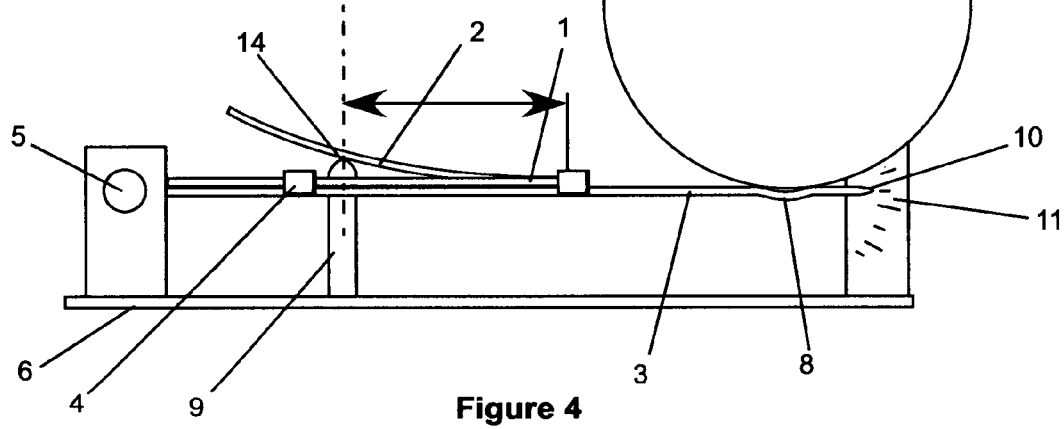
FIG. 4 is an elevation of the cantilever spring and weight, with the spring in a third position.

Next, as shown in FIG. 4, the second weight 15 is replaced by a third spherical known mass of known volume and hereinafter referred to as the third weight 16, having a different volume and a larger mass than the second weight 15. If the tip of the beam 10 is to remain pointing to the same given position on the scale 11 as in FIGS. 3 and 2, the spring 1 will have to be moved to a third position 14 (also illustrated as "C" in FIG. 1) such that the cantilever length of the leaf 2 to the point of contact with the post 9 is shorter than it was with the second weight 15 as in FIG. 3, and the effective spring constant of the leaf spring element 2 is greater than it was with the second weight 15 as in FIG. 3.

The deflection of the point of force application on a cantilever element such as the spring leaf 2 is proportional to the cube of the length of the cantilever to that point, and the force applied at that point. The translation or shifting of the spring 1 relative to the pivot 5 and consequently post 9 effectively shortens the cantilever of the leaf spring element 2. The cantilever illustrated in FIG. 1 can, by virtue of movement of the spring 1 relative to the beam 3, be adjusted to support a large range of weights without the beam 3 contacting the ground plate 6.

Because of the cubic relationship to the cantilever length, at a given deflection of the tip of the beam 10, the ratio of any two weights placed on the beam will vary as the cube of the inverse ratio of lengths of the cantilever 2 needed to maintain a fixed deflection of the tip of the beam. Put more simply, this means that if the length of the cantilever 2 is reduced by half, the weight deflecting it will have to increase by a factor of 8 in order to keep the tip of the beam 10 pointing to the given point on the scale 11. Similarly, if the length of the cantilever 2 is reduced by two thirds, the weight will have to be increase by a factor of 27 to keep the tip of the beam 10 pointing to the given point on the scale 11.

Thus a beam with an adjustable length cantilever spring is a compact means of indicating three orders of magnitude of weight on a single scale. By arranging the numbering of the scale 11 to be related to the position of the leaf 2, such a scale might be constructed. The renumbering of such a scale to indicate weight is addressed below.

Figure 5:
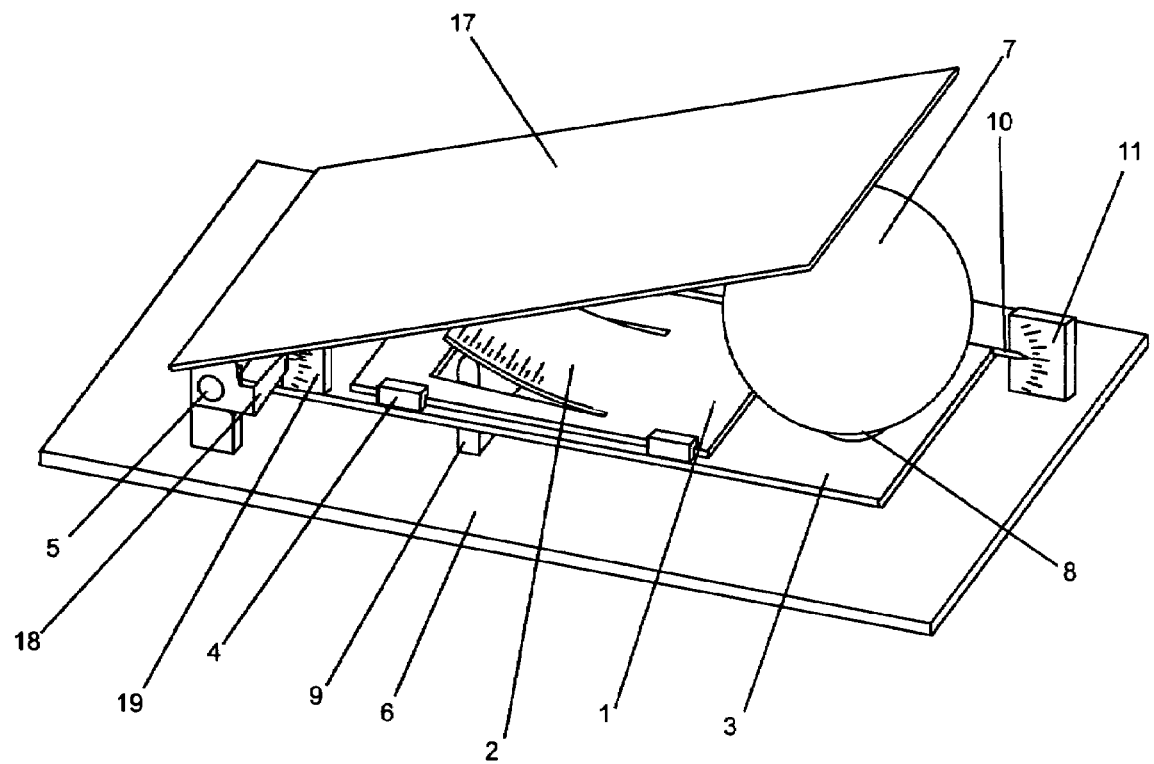
FIG. 5 is an oblique view of a cantilever spring and weight with a hinged plate.

FIG. 5 is an oblique view illustration of the cantilever spring leaf 2 and beam 3 described supra, but with the addition of a hinged plate 17, hereinafter referred to as the lid 17. The lid 17 is pivoted and so arranged as to be able to lie against the first or other weight. The pivot is, in this instance, (though not necessarily) the same as the pivot 5 of the beam 3, and will form an angle with the beam 3, as illustrated by the pointer 18 and the angle scale 19.

Figure 6:
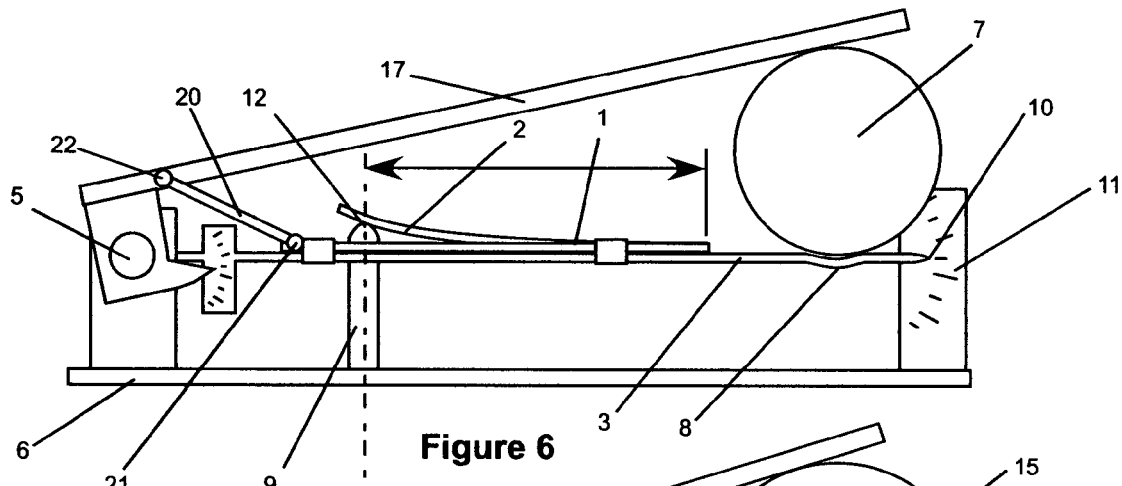
FIG. 6 is an elevation of a cantilever spring and weight with a hinged plate, a link between the hinged plate and spring, with the spring in a first position.

FIG. 6 is an elevation view of the assembly shown in an oblique view in FIG. 5, with a link 20 connected to the lid 17 by pivot 22 and to the spring 1 by pivot 21. In FIG. 6 the lid is touching the surface of first weight 7. Because of the connection of the spring 1 to the lid 17 by the link 20, the angular position of the lid will define a position of the spring relative to the beam 3. This position will, in turn, define the length of the cantilever leaf 2 to its point of contact with the post 9. The length of the leaf 2 defines the effective spring constant of the spring 1 and consequently the deflection due to an applied force of the tip of the beam 10 relative to the scale 11.

Figure 7:
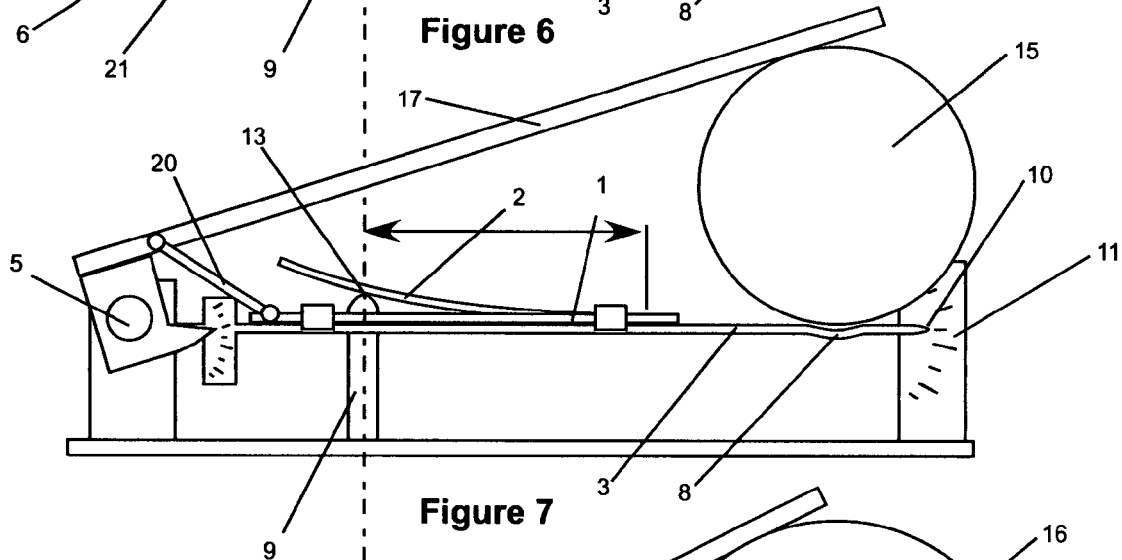
FIG. 7 is an elevation of a cantilever spring and weight with a hinged plate, a link between the hinged plate and spring, with the spring in a second position.

In FIG. 7, the first weight 7 has been replaced by the second weight 15, and the lid 17 is touching the surface of the second weight 15. Again because of the linkage of the lid 17 to the spring 1 by the link 20, the position of the spring 1 is defined by the angular position of the lid 17 and the position of the spring 1 relative to the beam 3 determines the length of the leaf 2 to its point of contact with the post 9. The length of the leaf defines the effective spring constant of the spring 1 and consequently the deflection of the tip of the beam 10 relative to the scale 11.

Figure 8:
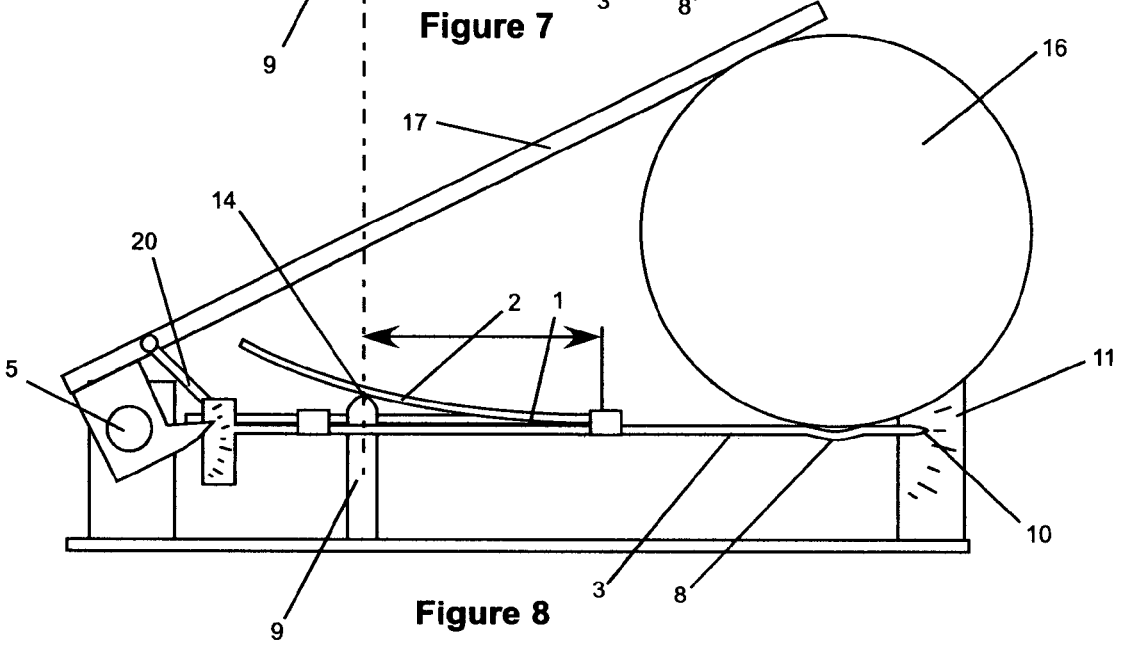
FIG. 8 is an elevation of a cantilever spring and weight with a hinged plate, a link between the hinged plate and spring, with the spring in a third position.
Figure 9:
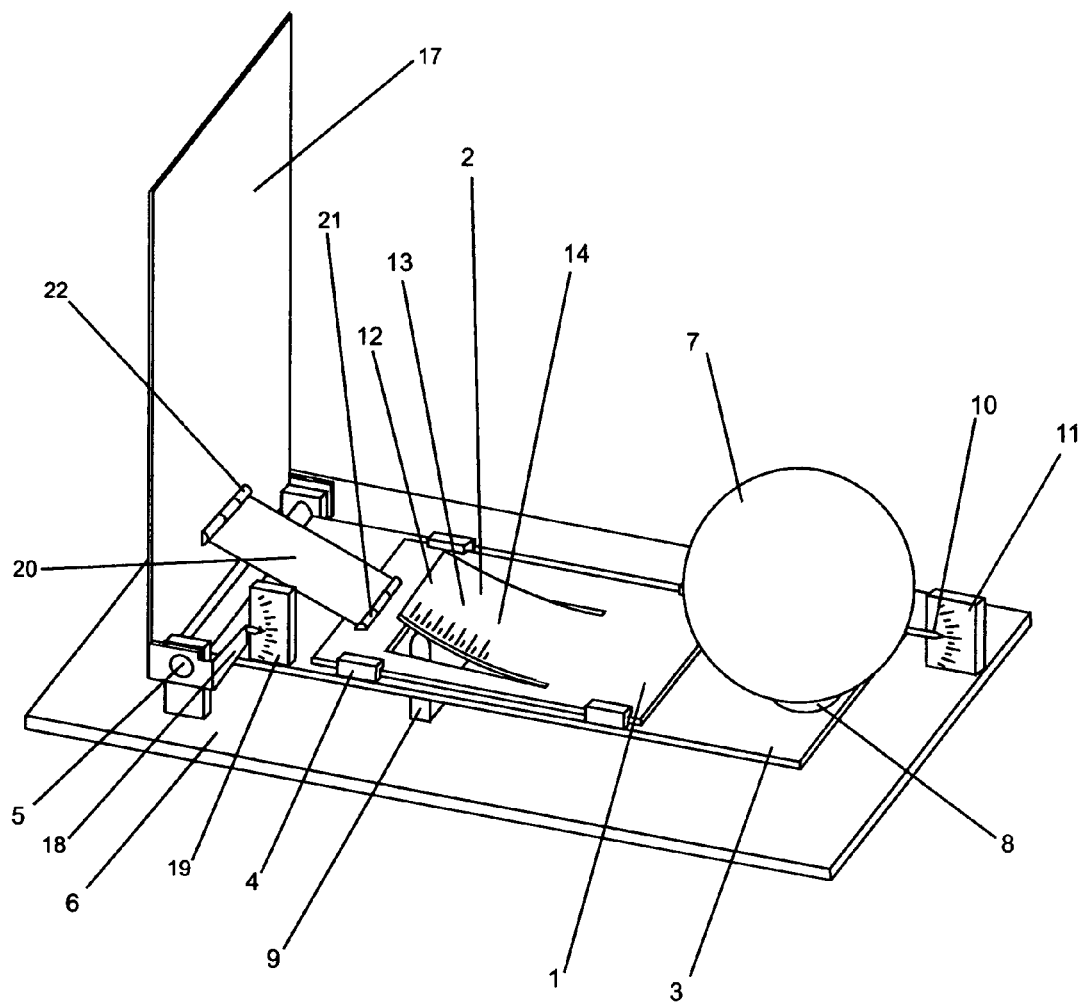
FIG. 9 is an oblique view of a cantilever spring and weight with a hinged plate and a link between the hinged plate and the spring. The hinged plate is in an open position so as to show the link.

In FIG. 8, the second weight 15 has been replaced by the third weight 16, and the lid 17 is touching the surface of the third weight 15. Again because of the linkage of the lid 17 to the spring 1 by the link 20, the position of the spring 1 is defined by the angular position of the lid 17 and the position of the spring 1 relative to the beam 3 determines the length of the leaf 2 to its point of contact with the post 9. The length of the leaf to its point of contact with post 9 defines the effective spring constant of the spring 1 and consequently the deflection of the tip of the beam 10 relative to the scale 11.

The third weight 16 was defined earlier as having greater mass and a different volume than the second weight 15, and the second weight 15 was defined as having a greater mass and a different volume than the first weight. Now, for the purpose of the discussion of this novel invention, we will add a further relationship to the first weight 7, the second weight 15 and the third weight 16: we will require that the density of each is equal. Density is the quotient of weight in the numerator and volume in the denominator. This means that the volume will always be chosen to equal a constant proportion of the weight for each of the first, second and third weights 7, 15 and 16.

An objective of the invention is to make a relative measure of the juice content of produce by making a relative measure of density. Thus it is desirable for pieces of produce having similar juice content, though of disparate size and weight, to have equal readout of a value related to density on the novel device. Returning to the FIGS. 6, 7 and 8, now with the first weight 7, second weight 15 and third weight 16 having also equal density, it will be clear to the practitioner (skilled worker in the art) that a certain configuration of the lid 17 touching the surface of the spherical weight (7, 15, 16), the link 20, the spring 1, the beam 3, the post 9, the leaf 2 and the pivot 5 (or pivots, if there are separate pivot points), will result in a readout that is the same when the density of the object (in this instance the first 7, second, 15 or third, 16 weight, but in the general instance an object of produce) is the same.

Specifically, this constant readout for a constant density of the object is possible because there is a cubic mathematical relationship between spherical diameter and mass for a material of constant density and a cubic mathematical relationship between the lengths and spring constants of a cantilever spring. Because of this, a linear change in the diameter of a spherical weight can effect a linear change in the length of a cantilever spring by employing link 20 that effects an approximately constant proportional change in leaf 2 length for a change in lid 17 angle as indicated by the pointer over the angle scale 19, such angle change being in turn approximately proportional to a change in diameter of the object and the corresponding cubic change in volume and thus weight (in the instance of constant density) is matched by the cubic change in spring stiffness so that the readout on the scale 11 remains constant.

Accordingly, the presently preferred embodiment of the invention employs:
  (a) a produce piece support means in the form of a pivotable beam 3, coupled to a base member 6 via a spring biasing means 1 and 2 for producing varying deflection of the produce piece support means in response to varying weights of similarly shaped pieces of produce placed thereon;
  (b) produce piece size measuring means 17 in the form of a pivotable lid;
  (c) spring constant modifying means 20 for non-linearly increasing the effective spring constant of the spring biasing means as a cubic function in response to increases in the size (typically the approximate radius) of a particular piece of produce sensed by the pivotable lid measuring means and for non-linearly decreasing the effective spring constant of the spring biasing means as a cubic function in response to decreases in the size of a particular piece of produce sensed by the pivotable lid measuring means.

The spring constant modifying means includes a translatable, shiftable, cantilevered spring portion or leaf 2, contacting a fulcrum member 9, and linkage coupling means 20 coupled between the cantilevered spring portion of the spring biasing means and the produce piece size measuring means, for decreasing the effective length of the cantilevered spring portion in response to increases in size indications produced by the pivotable lid produce size measuring means and increasing the effective length of the cantilevered spring portion in response to decreases in size indications produced by the pivotable lid produce size measuring means.

It is not an object of this novel invention to claim the invention of density measurement, but rather to describe a novel combination of elements that together comprise a new, compact, rapid and inexpensive means of using relative density to compare and rank objects by a value related to density regardless of size and weight disparity.

By adding an adjustable degree of freedom between the lid 17 in FIG. 6 and the link 20, such that the location of the pivot 22 relative to the pivot point of the lid (in this instance 5) can be changed, the same device can be adjusted for different density ranges that might otherwise lie outside the range of motion of the tip of the beam 10. In addition, with the lid 17 maintained at a fixed angle to the beam 3 as indicated by the angle scale 19 and pointer 18, the same device can be adjusted to accommodate and measure 3 orders of magnitude of weight change. With calibration, such a device can furthermore measure weight in accurate and absolute engineering units.

Each measured object of produce is generally based on the same set of deliberate assumptions:

1. Produce of the same species is in general of a similar shape.

2. Produce of the kind measured by this invention is made up primarily of water; other solids are a small proportion of the overall mass, and remain relatively constant for a given species and weight of produce.

3. Preferably, produce with an approximate axis of radial symmetry, and, in a plane more or less perpendicular to this axis, and having approximate maximum diameter that I call the "representative diameter" will be measured with the invention.

4. All produce to be compared of a given species will be oriented in the same way on the support beam.

5. The approximate axis of symmetry of the produce will be substantially aligned with the vertical axis of the cup of the invention. If it is not substantially aligned with the vertical axis of the cup on the support beam, it will at least be aligned substantially the same way from individual piece to individual piece of a given species.

6. Precision of the preferred embodiment is sufficient to discriminate between the liquid content of individual pieces of produce of the same species, at least by ranking of the pieces in comparison to each other.

While it may be possible to describe mathematically the exact proportions and dimensions of this device in order to maximally linearize the relationship between the quotient of volume and weight and the deflection of the tip of the beam 10 as indicated by the scale 11, it is not a requisite of this invention to do so. This is because the device is intended to enable comparison of quantities related to the densities of similar members of a species of produce of disparate size and weight. Non-linearity of the device is not relevant to the process of ranking produce of the same species by relative density unless the relationship between density and deflection of the tip of the beam is not monotonic with density. The device is not intended for comparison of the relative densities of produce of different species inter alia, nor is it intended to accurately measure density in engineering units. Thus so long as the deflection of the tip of the beam 10 as indicated by the scale 11 increases with increasing density, given that the lid 17 is contacting the surface of the approximately spherical produce, and subject to the assumptions supra, the device will fulfill its inventive purpose.

In use, the device defined supra would be held by hand or placed on an approximately level surface. The lid 17 would be opened to an angle large enough to permit placement in a fixed location 8 on the beam 3 a piece of produce generally conforming to the assumptions listed above. The lid 17 would be lowered until it was in contact with the surface of the produce. If the density of the piece being measured fell within the design range of the device, the readout would visually indicate a value related to density. Other pieces of the same species of produce would similarly replace the first piece, permitting ranking of the measured pieces in order of increasing density. The densest piece of produce would contain the most juice. Of course, the device is not intended to evaluate other aspects of desirability of the produce, such as blemishes or bruises or moldy/damaged/rotted condition. If the device is so constructed and adjusted as to be calibrated for specific categories of produce, it is additionally possible to compare each piece of produce to a standard value, to this end an additional degree of freedom at hinge point 22 would permit fine adjustment of the readout.

While the invention has been described in connection with preferred embodiments, the description is not intended to limit the scope of the invention to the particular forms set forth, but on the contrary, it is intended to cover such alternatives, modifications, and equivalents as may be included within the spirit and scope of the invention as indicated by the language of the appended claims.

I claim:

1. Apparatus for providing an indication of relative density of similarly shaped pieces of produce regardless of variations in size and weight thereof comprising:
   (a) a produce piece support means coupled to a base member;
   (b) a spring biasing means for enabling varying deflection of said produce piece support means in response to varying weights of said similarly shaped pieces of produce placed thereon;
   (c) produce piece size measuring means;
   (d) spring constant modifying means for (a) non-linearly increasing the effective spring constant of said spring biasing means as a cubic function in response to increases in the size of a particular piece of produce sensed by said measuring means, and (b) non-linearly decreasing the effective spring constant of said spring biasing means as a cubic function in response to decreases in the size of a particular piece of produce sensed by said measuring means.

2. Apparatus of claim 1 wherein said produce piece support means comprises an elongated beam pivotably coupled to said base member and including readout means having a pointer member movable over a scale for indicating changes in relative measured densities of said produce.

3. Apparatus of claim 1 wherein said spring constant modifying means includes a cantilevered spring contacting a fulcrum member and coupling means coupled between said spring biasing means and said produce piece size measuring means, for decreasing the effective length of said cantilevered spring portion in response to increases in size indications produced by said produce size measuring means, and increasing the effective length of said cantilevered spring portion in response to decreases in size indications produced by said produce size measuring means.

4. Apparatus of claim 3 wherein said produce piece support means comprises an elongated beam pivotably coupled to said base member and including readout means having a pointer member movable over a scale for indicating changes in relative measured densities of said produce.

5. Apparatus of claim 3 wherein said produce size measuring means comprises a produce contact member, resting against produce supported by said produce piece support means.

6. Apparatus of claim 5 wherein said produce piece support means comprises an elongated beam pivotably coupled to said base member and including readout means having a pointer member movable over a scale for indicating changes in relative measured densities of said produce.

7. Apparatus of claim 5 wherein said produce contacting member is a pivoted lid.

8. Apparatus of claim 7 wherein said produce piece support means comprises an elongated beam pivotably coupled to said base member and including readout means having a pointer member movable over a scale for indicating changes in relative measured densities of said produce.

9. Apparatus for providing an indication of relative density of similarly shaped pieces of produce regardless of variations in size and weight thereof comprising:
   (a) a produce piece beam support member coupled to a base member and being supported by a fulcrum member for enabling varying angular rotations of said produce piece support means in response to varying weights of said similarly shaped pieces of produce placed upon said produce piece beam support member;
   (b) produce size measuring means;
   (c) spring biasing means coupled to said produce beam support member comprising a cantilevered spring portion contacting said fulcrum member and
   (d) coupling means coupling said spring biasing means and said produce piece measuring means together for (a) shifting the position of said cantilevered spring portion with respect to said fulcrum member for decreasing the effective length of said cantilevered spring portion in response to increases in size indications produced by said produce size measuring means, and (b) increasing the effective length of said cantilevered spring portion in response to decreases in size indications produced by said produce size measuring means.

10. Apparatus of claim 9 wherein said produce piece support means comprises an elongated beam pivotably coupled to said base member and including readout means having a pointer member movable over a scale for indicating changes in relative measured densities of said produce.

11. Apparatus of claim 9 wherein said size measuring means includes a produce contact member, resting against produce being supported by said support means.

12. Apparatus of claim 11 wherein said produce piece support means comprises an elongated beam pivotably coupled to said base member and including readout means having a pointer member movable over a scale for indicating changes in relative measured densities of said produce.

13. Apparatus of claim 11 wherein said produce contacting member is a pivoted lid.

14. Apparatus of claim 13 wherein said produce piece support means comprises an elongated beam pivotably coupled to said base member and including readout means having a pointer member movable over a scale for indicating changes in relative measured densities of said produce.

15. Apparatus for providing a readout indication of relative density of similarly shaped pieces of produce regardless of variations in size and weight thereof comprising:
   (a) a produce piece beam support member supported by a fulcrum member for enabling varying angular rotations of said produce piece support means in response to varying weights of said similarly shaped pieces of produce placed upon said produce piece beam support member;

(b) produce size measuring means;

(c) spring biasing means positioned on said produce beam support member including a cantilevered spring portion contacting said fulcrum member and (d) linkage means for translating the position of said cantilevered spring portion with respect to said fulcrum member in response to angular changes in said produce size measuring means for (a) decreasing the effective length of said cantilevered spring portion in response to increases in size indications produced by said produce size measuring means, and (b) increasing the effective length of said cantilevered spring portion in response to decreases in size indications produced by said produce size measuring means.

16. Apparatus of claim 15 wherein said produce piece support means comprises an elongated beam pivotably coupled to said base member and including readout means having at pointer member movable over a scale for indicating changes in relative measured densities of said produce.

17. Apparatus of claim 15 wherein said size measuring means includes a produce contact member, resting against produce being supported by said support means.

18. Apparatus of claim 17 wherein said produce piece support means comprises an elongated beam pivotably coupled to said base member and including readout means having a pointer member movable over a scale for indicating changes in relative measured densities of said produce.

19. Apparatus of claim 17 wherein said produce contacting member is a pivoted lid.

20. Apparatus of claim 19 wherein said produce piece support means comprises an elongated beam pivotably coupled to said base member and including readout means having a pointer member movable over a scale for indicating changes in relative measured densities of said produce.

\* \* \* \* \*